(12) United States Patent
Chen

(10) Patent No.: US 8,836,854 B2
(45) Date of Patent: Sep. 16, 2014

(54) ELECTRONIC DEVICE HAVING IMAGE CAPTURING DEVICE CAPABLE OF ADJUSTING VIEW ANGLES

(71) Applicant: Hon Hai Precision Industry Co., Ltd., New Taipei (TW)

(72) Inventor: Shu-Ying Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 21 days.

(21) Appl. No.: 13/744,389

(22) Filed: Jan. 17, 2013

(65) Prior Publication Data

US 2014/0063173 A1 Mar. 6, 2014

(30) Foreign Application Priority Data

Aug. 29, 2012 (TW) .............................. 101131390 A

(51) Int. Cl.
*H04N 5/225* (2006.01)
*H04N 7/14* (2006.01)

(52) U.S. Cl.
CPC ............ *H04N 7/142* (2013.01); *H04N 5/2251* (2013.01)
USPC ...................................................... 348/373

(58) Field of Classification Search
None
See application file for complete search history.

(56) References Cited

U.S. PATENT DOCUMENTS

| | | | |
|---|---|---|---|
| 2003/0142973 A1* | 7/2003 | Sawada ......................... | 396/427 |
| 2004/0196403 A1* | 10/2004 | Lee ............................... | 348/373 |
| 2004/0245342 A1* | 12/2004 | Cho et al. ................ | 235/472.01 |
| 2005/0049019 A1* | 3/2005 | Lee ............................ | 455/575.4 |
| 2005/0110887 A1* | 5/2005 | Shin et al. ................ | 348/333.06 |
| 2005/0140812 A1* | 6/2005 | Yoo et al. ................. | 348/333.06 |
| 2005/0225668 A1* | 10/2005 | Kim ............................. | 348/373 |
| 2005/0263600 A1* | 12/2005 | Yang et al. .............. | 235/472.01 |
| 2006/0197863 A1* | 9/2006 | Kim ............................. | 348/335 |
| 2010/0141830 A1* | 6/2010 | Zhang ......................... | 348/374 |
| 2010/0158511 A1* | 6/2010 | Zhang ......................... | 396/535 |
| 2012/0013584 A1* | 1/2012 | Senatori ...................... | 345/207 |

* cited by examiner

*Primary Examiner* — Justin P Misleh
(74) *Attorney, Agent, or Firm* — Novak Druce Connolly Bove + Quigg LLP

(57) ABSTRACT

An electronic device includes a shell, an image capturing device, a sliding key, and a driving element. The shell defines a receiving space and a through hole communicating the receiving space. The image capturing device is received in the receiving space and includes a supporting frame having a pair of rotation shafts rotatably connected with the shell and a matching block. The matching block defines a rectangular matching hole. The sliding key includes an operation portion outside receiving space and a connection portion extending from the operation portion into the receiving space. The connection portion is received and slidable in the through hole. The driving element includes a main portion connected with the connection portion and a driving arm extending from the main portion. The driving arm includes a driving portion slidable in the matching hole for driving the supporting frame to rotate.

10 Claims, 5 Drawing Sheets

ELECTRONIC DEVICE HAVING IMAGE CAPTURING DEVICE CAPABLE OF ADJUSTING VIEW ANGLES

BACKGROUND

1. Technical Field

The present disclosure relates to electronic devices, and particularly to an electronic device having an image capturing device capable of adjusting view angles.

2. Description of Related Art

Electronic devices such as video telephones are equipped with an image capturing device for imaging functions. However, the image capturing device is usually fixedly mounted on a shell of the video telephone and the shell is fixedly mounted on a wall. View angles can not be adjusted for a user except when the user moves the video telephone, which is inconvenient.

Therefore, it is desirable to provide an electronic device having an image capturing device, which can overcome the limitations described.

DETAILED DESCRIPTION

Embodiments of the disclosure will be described with reference to the drawings.

Figure 1:
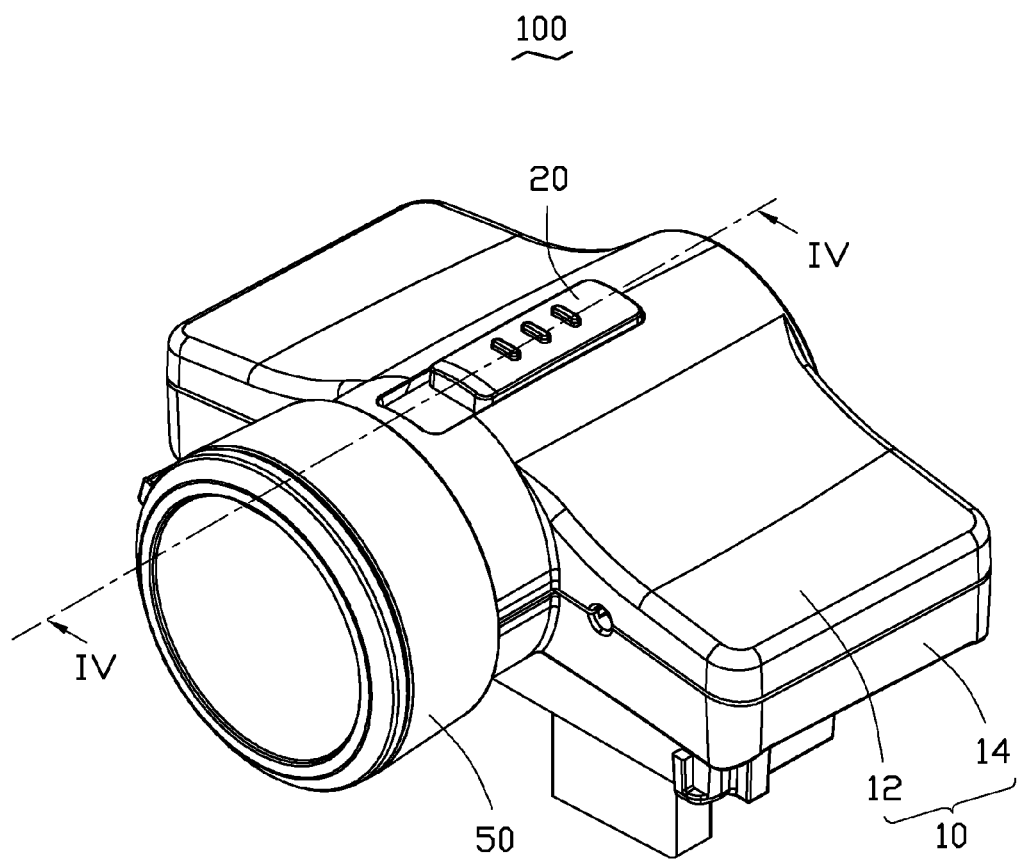
FIG. 1 is an assembled, isometric view of an electronic device having an image capturing device, in accordance with an exemplary embodiment.
Figure 2:
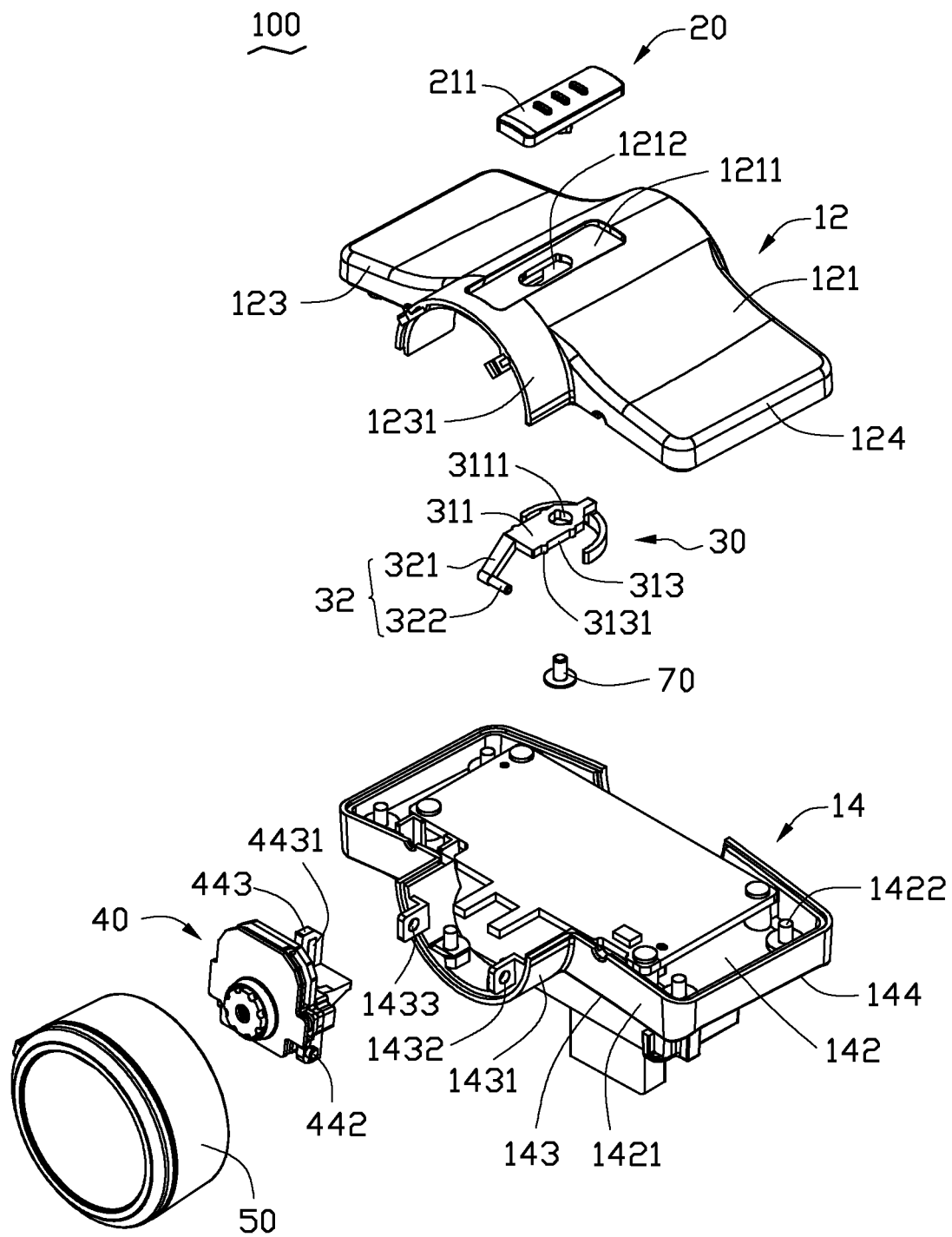
FIG. 2 is an exploded, isometric view of the electronic device having the image capturing device.
Figure 3:
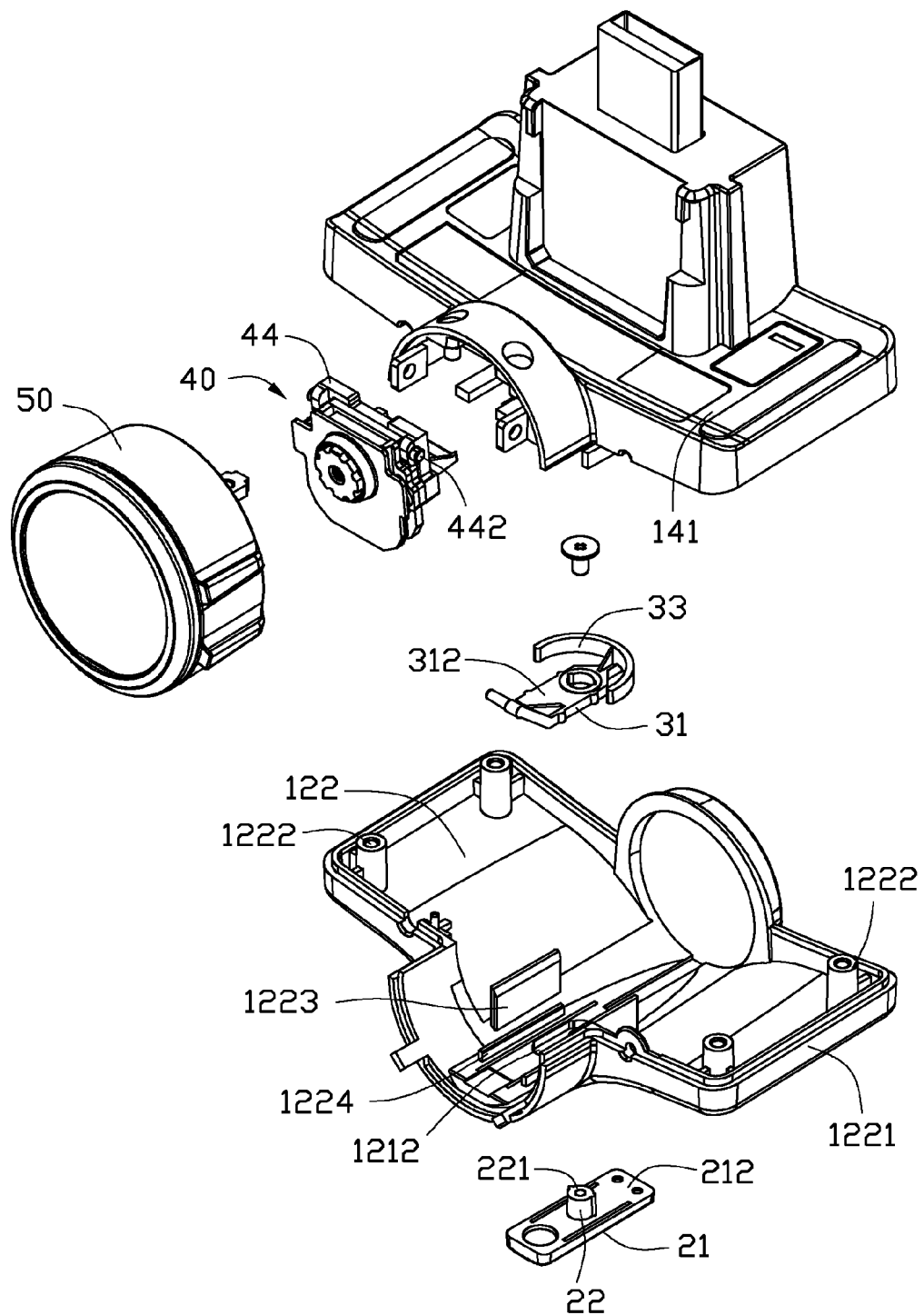
FIG. 3 is similar to FIG. 2, but viewed from another angle.

FIGS. 1 to 3 show an electronic device 100 in accordance with an exemplary embodiment. The electronic device 100 can be an all-in-one computer, a surveillance device, or a video telephone. In the embodiment, the electronic device 100 is a video telephone. The electronic device 100 includes a shell 10, a sliding key 20, a driving element 30, an imaging capturing device 40, and a cover 50.

The shell 10 includes a first part 12 (i.e., an upper part as shown in FIGS. 1-2) and a second part 14 (i.e., a lower part as shown in FIGS. 1-2). The first part 12 is substantially rectangular and includes a first outer surface 121, a first inner surface 122 opposite to the first outer surface 121, a pair of parallel first long sides 123, and a pair of parallel first short sides 124 perpendicularly connecting the first long sides 123. The first part 12 defines a substantially rectangular sliding groove 1211 in the first outer surface 121 and a substantially rectangular through hole 1212 in a bottom surface of the sliding groove 1211 and through the first inner surface 122. The sliding groove 1211 is positioned in a center of the first outer surface 121. Long sides of the sliding groove 1211 are parallel to the first short sides 124. The through hole 1212 is positioned in a center of the sliding hole 1211. Long sides of the through hole 1212 are parallel to the long sides of the sliding groove 1211.

The first part 12 also includes an upper sidewall 1221, four assembling portions 1222, a pair of parallel first rail plates 1223, and a pair of parallel second rail plates 1224. The upper sidewall 1221 is discontinuous and extends up from the first long sides 123 and the first short sides 124 of the first inner surface 122. The upper sidewall 1221 defines an opening (not labeled) in a middle of one of the first long sides 123. An arched upper lug 1231 perpendicularly extends from the upper sidewall 1221 around the opening of the upper sidewall 1221. The four assembling portions 1222 are distributed at four corners of the first inner surface 122, respectively. Each assembling portion 1222 is a hollow cylinder.

The first rail plates 1223 extend from the first inner surface 122 adjacent to the upper lug 1231 and symmetrically distributed at two sides of the through holes 1212. The first rail plates 1223 are parallel to the long sides of the through hole 1212. A length of each first rail plate 1223 along a direction parallel to the long sides of the through hole 1212 is greater than a length of each long side of the through hole 1212. The second rail plates 1224 also extend from the first inner surface 122 adjacent to the upper lug 1231 and symmetrically distributed at two sides of the through holes 1212. The second rail plates 1224 are positioned between the first rail plate and parallel to the long sides of the through hole 1212. A length of each second rail plate 1224 along the direction parallel to the long sides of the through hole 1212 is greater than the length of each long side of the through hole 1212. A height of each second rail plate 1224 perpendicular to the first inner surface 122 is less than a height of each first rail plate 1223.

The second part 14 is substantially rectangular and includes a second outer surface 141, a second inner surface 142 opposite to the second outer surface 141, a pair of parallel second long sides 143, and a pair of parallel second short side 144 perpendicularly connecting the second long sides 143. The second part 14 also includes a lower sidewall 1421 and four engaging portions 1442. The lower sidewall 1421 is discontinuous and extends up from the second long sides 143 and the second short sides 144 The lower sidewall 1421 defines an opening (not labeled) in a middle of one of the second long sides 143. An arched lower lug 1431 perpendicularly extends from the lower sidewall 1421 around the opening of the lower sidewall 1421. A shape of the lower lug 1431 corresponds to a shape of the upper lug 1231. A pair of ear portions 1432 inwardly extend from a periphery of the lower lug 1431. Each ear portion 1432 defines a shaft hole 1433. The four engaging portions 1422 are uniformly distributed at four corners of the second inner surface 142. Each engaging portion 1422 is a cylinder and used to be clamped in a corresponding assembling portion 1222.

The sliding key 20 includes a rectangular plate-liked operation portion 21 and a connection portion 22. The operation portion 21 includes a top surface 211 and a bottom surface 212 opposite to the top surface 211. A length of each long side of the operation portion 21 is less a length of each long side of the sliding groove 1211. A width and a thickness of the operation portion 21 correspond to a width and a depth of the sliding hole 1211, respectively. The connection portion 22 is substantially cylindrical and perpendicularly extends from the middle of the bottom surface 212. A diameter of the connection portion 22 is less than or corresponds to a width of the through hole 1212. The connection portion 22 defines a screw hole 221 in an end surface facing away the bottom surface 221.

The driving element 30 includes a plate-liked main portion 31, a driving arm 32, and an elastic arm 33. The main portion 31 includes a contact surface 311, a connection surface 312 opposite to the contact surface 311, and a pair of side surfaces 313 perpendicularly connected between the contact surface 311 and the connection surface 312. One end of the main portion 31 defines a receiving hole 3111 passing through the contact surface 311 and the connection surface 312. The receiving hole 3111 is used to receive the connection portion 22. A distance between the side surfaces 313 corresponds to a distance between the second rail plates 1224. Two protrusions 3131 extend from each side surface 313. One protrusion 3131 of one side surface 313 and a corresponding protrusion 3131 of the other side surface 313 consist a pair of protrusions 3131. A distance between the pair of protrusions is slightly greater than the distance between the second rail plates 1224.

The driving arm 32 extends from the other end of the main portion 31 away from the receiving hole 3111. The driving arm 32 includes an intermediate portion 321 and a driving portion 322. The intermediate portion 321 is connected to the connection surface 312 and forms an obtuse angle about 120 degrees with the connection surface 312. The driving portion 322 perpendicularly extends from a distal end of the intermediate portion 321 and is parallel to the connection surface 312.

The elastic arm 33 is arched and the middle of the elastic arm 33 is connected to the connection surface 312 away from the driving arm 32. Two distal ends of the elastic arm 33 extend to the driving arm 32 and are symmetrically flange the side surfaces 313. A distance between the two distal ends of the elastic arm 33 is slightly greater than a distance between the first rail plates 1223.

Figure 4:
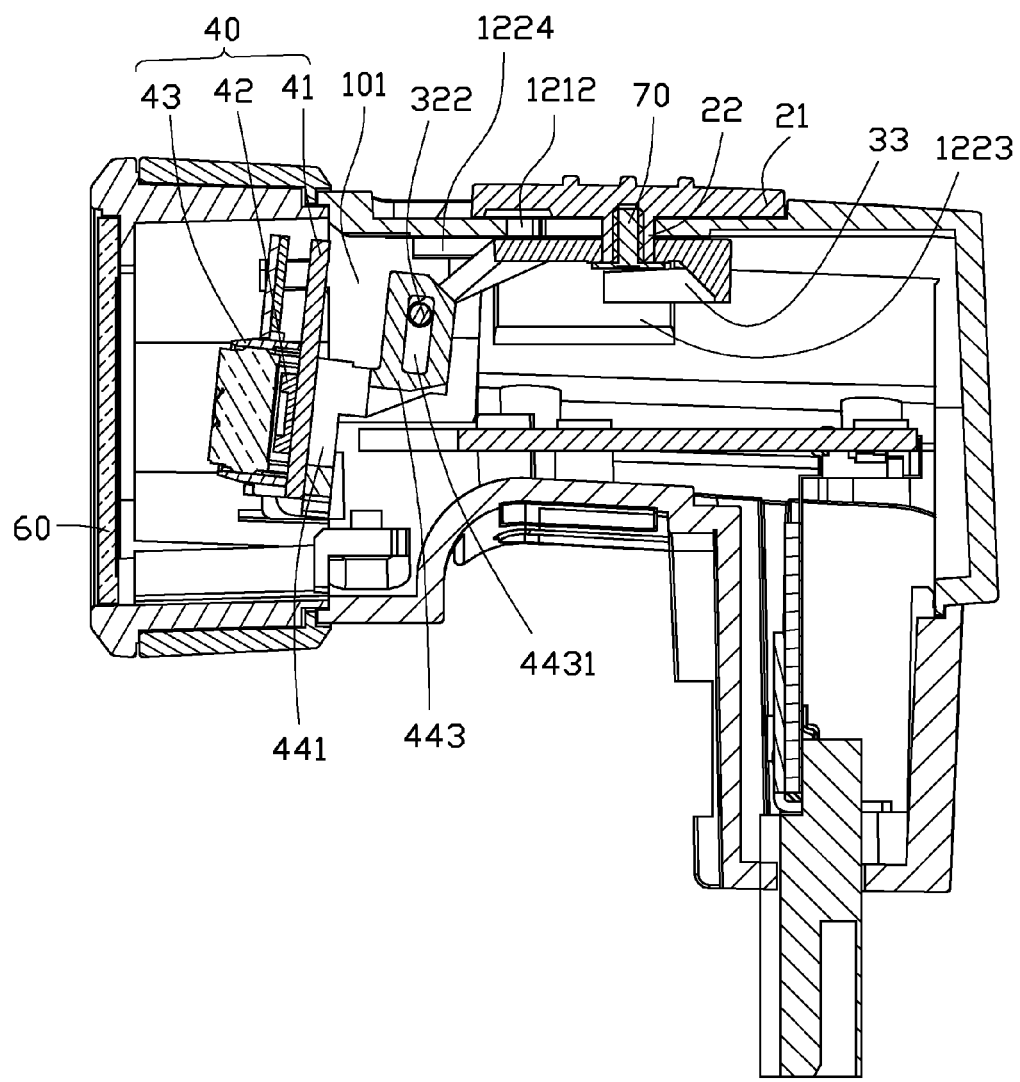
FIG. 4 is a cross-sectional view taken along a line IV-IV of FIG. 1, the image capturing device in a first stage.

Also referring to FIGS. 3 and 4, the image capturing device 40 includes a circuit board 41, an image sensor 42 mounted on the circuit board 41, a lens module 43 mounted on the circuit board 41, and a supporting frame 44. The supporting frame 44 includes a mounting plate 441, a pair of rotation shafts 442, and a matching block 443. The circuit board 41 is fixed on the mounted plate 441. The rotation shafts 442 are cylindrical and coaxially extend from two sides of the mounted plate 441. Each rotation shaft 442 corresponds to a shaft hole 1433. The matching block 443 extends from a surface of the mounting plate 441 opposite to the circuit board 41. The matching block 443 defines a substantially rectangular matching hole 4431 passing thereof. A width of the matching hole 4431 corresponds to a diameter of the driving portion 322.

The cover 50 is a hollow cylinder and an inner diameter of the cover corresponds to outer diameters of the upper lug 1231 and the lower lug 1431. The cover 50 receives a circular glass plate 60 at one end. The glass plate 60 can be an infrared filter or a transparent glass plate. In the embodiment, the glass plate 60 is a transparent glass plate.

When assembling, the operation portion 21 is received in the sliding groove 1211, the connection portion 22 is passed through the through hole 1212. The operation portion 21 is slidable in the sliding groove 1211 and, accordingly, the connection portion 22 is slidable in the through hole 1212. The main portion 31 is limited between the second rail plates 1224 with two protrusions 3131 of each side surface 313 are attached on a respective second rail plate 1224. The contact surface 311 contacts the first inner surface 122. The elastic arm 33 is limited between the first rail plates 1223 with each distal end is attached a corresponding first rail plate 1223. Then the connection portion 22 is received in the receiving hole 3111 from the contact surface 311. A screw 70 is passed into the receiving hole 3111 from the connection surface 312 and engaged with the screw hole 221 such that the sliding key 20 is connected with the driving element 30.

Each rotation shaft 442 is received in a respective shaft hole 1433 such that the image capturing device 40 is rotatably connected to the second part 14. The driving portion 322 is received in the matching hole 4331 and is slidable in the matching hole 4331. The long sides of the matching hole 4331 are perpendicular to a center axis of the rotation shafts 442. Each assembling portion 1222 sleeves over a respective engaging portion 1422. The upper sidewall 1221 and the lower sidewall 1421 are attached to each other. Therefore, the first part 12 and the second part 14 are assembled together and cooperatively form a receiving space 101. The driving element 30 and the image capturing device 40 are received in the receiving space 101. The through hole 1212 communicates with the receiving space 101 and the connection portion 22 extends into the receiving space 101. The operation portion 21 is outside the receiving space 101. The upper lug 1231 and the lower lug 1431 cooperatively form a hollow cylinder. Then the cover 50 sleeves over the upper lug 1231 and the lower lug 1431.

Figure 5:
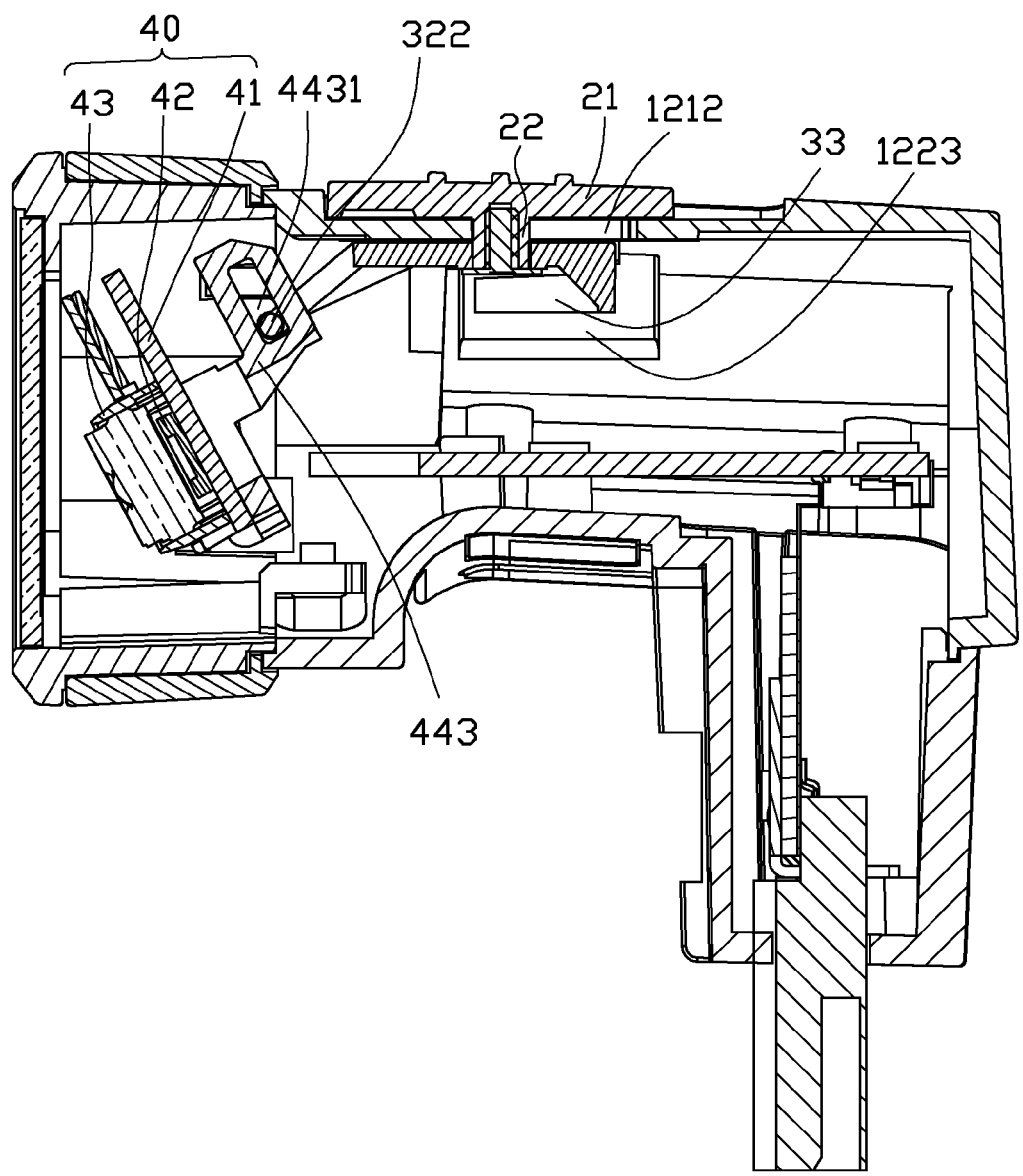
FIG. 5 is a cross-sectional view taken along a line IV-IV of FIG. 1, the image capturing device in a second stage.

Referring to FIGS. 4 and 5, in use, when a user slides the sliding key 20 from one end to the other end in the sliding hole 1212, the connection portion 22 is moved from one end to the other end in the through hole 1212, and the sliding key 20 brings the driving element 30 to move along a direction perpendicular to the center axis of the rotation shafts 442. The driving portion 322 slides from one end to the other end in the matching hole 4431 to push or pull the matching block 443. Therefore, the supporting frame 44 is clockwise or counter-clockwise rotated about the shaft portions 442, and the image capturing device 40 is clockwise or counterclockwise rotated about the shaft portions 442 relative to the second part 14, accordingly. Therefore, view angles of the image capturing device 40 can be adjusted.

The friction forces between the elastic arm 33 and the first rail plates 1223 can maintain the image capturing device 40 at a designed view angle when the user does not slide the sliding key 20.

In alternative embodiments, the main portion 31 does not include the protrusions 3131, each side surfaces 313 is attached on a second corresponding rail plate 1224.

In alternative embodiments, the first part 12 does not include the first rail plates 1223 and the drive element 30 does not include the elastic arm 33. The friction forces between the main portion 31 and the second rail plates 1224 maintain the image capturing device 40 at a designed view angle when the user does not slide the sliding key 20.

In alternative embodiments, the first part 12 does not include the first rail plates 1223 and the second rail plates 1224. The image capturing device 40 is maintained at a designed view angle when the user does not slide the sliding key 20 by other elements.

In alternative embodiments, the elastic arm 33 can be other shape, for one example, a pair of L-shaped elastic arms separate from each other.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electronic device, comprising:
a shell defining a receiving space and a through hole communicating with the receiving space;
an image capturing device received in the receiving space, the image capturing device comprising a supporting frame, the supporting frame having a pair of rotation shafts and a matching block, the rotation shafts being rotatably connected to the shell, the matching block defining a substantially rectangular matching hole, long sides of the matching hole being perpendicular to a center axis of the rotation shafts;
a sliding key comprising an operation portion and a connection portion, the operation portion positioned outside of the receiving space, the connection portion extending from the operation portion into the receiving space, the connection portion being received and slidable in the through hole; and a driving element comprising a main portion connected with the connection portion and a driving arm extending from the main portion, the driving arm comprising a driving portion received and slidable in the matching hole for driving the supporting frame to rotate about the rotation shafts.

2. The electronic device of claim 1, wherein the main portion is plate-liked, the driving arm comprises an intermediate portion, the intermediate portion is connected with the main portion and forms an obtuse angle with the main portion, and the driving portion perpendicularly extends from a distal end of the intermediate portion.

3. The electronic device of claim 2, wherein the shell comprises a first part, the first part comprises a first outer surface and a first inner surface, the first part defines a sliding groove in the first outer surface, the operation portion is received and slidable in sliding groove, and the through hole is positioned in a center of the sliding groove passing through the first inner surface.

4. The electronic device of claim 3, wherein the shell comprises a second part, and the second part and the first part cooperatively forms the receiving space.

5. The electronic device of claim 4, wherein the first part comprises an arched upper lug extending from a side of the first part, the second part comprises an arched lower lug extending from a side of the second part, the upper lug and the lower lug cooperatively consist a hollow cylinder, the electronic device comprises a hollow cylindrical cover, and the cover sleeves over the upper lug and the lower lug.

6. The electronic device of claim 5, wherein the cover receives a circular transparent glass plate.

7. The electronic device of claim 3, wherein the first part comprises a pair of parallel first rail plates, the first rail plates are symmetrically distributed at two sides of the though hole and extend from the first inner surface, the driving element comprises an elastic arm extending from the main portion facing away the driving arm, and the elastic arm is limited between the first rail plates and is attached on the first rail plates.

8. The electronic device of claim 7, wherein the elastic arm is arched-shaped, and two distal ends of the elastic arm are attached on the first rail plates.

9. The electronic device of claim 7, wherein the first part comprises a pair of parallel second rail plates, the second rail plates are symmetrically distributed at two sides of the though hole and extend from the first inner surface, the second rail plates are positioned between the first rail plates, and the main portion is limited between the second rail plates.

10. The electronic device of claim 9, wherein the main portion comprises a pair of side surfaces and a number of protrusions extending from each side surface, and the protrusions are attached on the second rail plates.

* * * * *